Feb. 4, 1936.  W. A. CHRYST  2,029,357

FLUID FLOW CONTROL DEVICE

Filed Sept. 13, 1934

INVENTOR
WILLIAM A. CHRYST
BY
Spencer, Hardman and Fehr
ATTORNEYS

Patented Feb. 4, 1936

2,029,357

UNITED STATES PATENT OFFICE 2,029,357

FLUID FLOW CONTROL DEVICE

William A. Chryst, Dayton, Ohio, assignor to General Motors Corporation, Detroit, Mich., a corporation of Delaware Application September 13, 1934, Serial No. 743,817

6 Claims. (Cl. 188—100)

This invention relates to improvements in fluid flow control devices particularly adapted for use in hydraulic shock absorbers.

It is among the objects of the present invention to provide a fluid flow control device of unitary structure, adapted to control fluid flow through a passage in opposite directions, and adapted to be adjusted thermostatically to vary such fluid flow control in accordance with temperature changes.

This object is attained by providing a unitary valve mechanism in the passage of a shock absorber which is adapted to transfer fluid from one side of the piston therein to the other. This valve mechanism comprises two valves, one adapted to establish a substantially unrestricted flow of fluid in one direction through said passage, the other adapted, in response to fluid pressure, to establish a restricted flow of fluid through said passage in the opposite direction, this latter valve having a fluid flow orifice which is adjustable by a thermostatic means to vary the restriction to the fluid flow by this valve in response to and in accordance with temperature changes.

Further objects and advantages of the present invention will be apparent from the following description, reference being had to the accompanying drawing wherein a preferred embodiment of one form of the present invention is clearly shown.

In the drawing.

Figure 1:
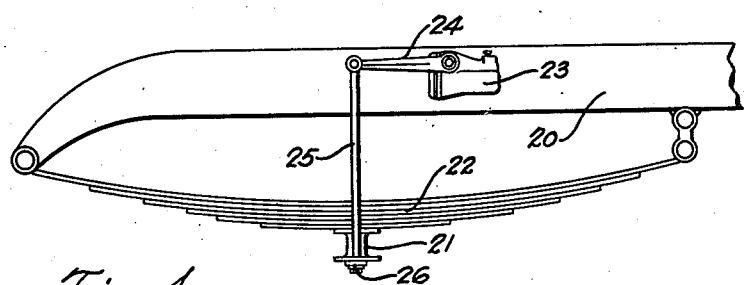
Fig. 1 is a fragmentary side view of the vehicle chassis with the vehicle wheels omitted, a shock absorber equipped with the present invention being shown applied thereto.

Referring to the drawing, the numeral 20 designates the frame of the vehicle which is supported upon the vehicle axle 21 by the vehicle springs 22. The shock absorber designated as a whole by the numeral 23 is secured to the frame 20. The operating arm 24 of the shock absorber has its free end swivelly secured to one end of a link 25, the opposite end of which is anchored to the axle by member 26.

The shock absorber 23 comprises a casing 30 providing a fluid reservoir 31 and a cylinder 32 in which a piston 33 is reciprocably supported. This piston has a passage 34 in its head, providing communication between the fluid displacement chamber 35 of the cylinder and the reservoir 31. A hardened, wear-resisting plate 36 is embedded in the head of the piston and is engaged by the free end of the operating cam 37 which is secured to a shaft 38 journalled in the shock absorber housing, one end of said shaft extending outside the housing and having the shock absorber operating arm 24 attached thereto. Interposed between the piston 33 and the closed end of the cylinder is a spring 40 which yieldably urges the piston so that its wearpiece 36 is maintained in substantially constant engagement with the operating cam 37. This spring 40 directly urges a cage 41 into engagement with the inner surface of the piston head, the cage forming an abutment member for spring 42 which engages and yieldably urges the intake valve 43 into engagement with an annular valve-seat 44 provided about the passage 34 in the piston head.

Figure 3:
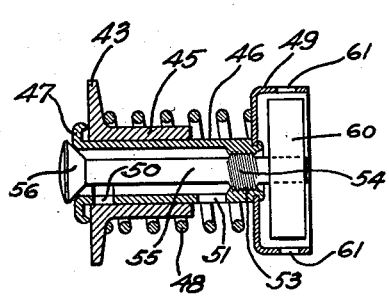
Fig. 3 is an enlarged sectional view of the improved unitary fluid flow control device.
Figure 4:
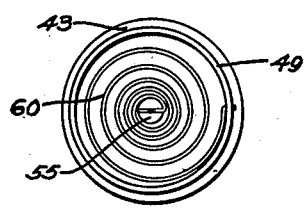
Fig. 4 is an end view of the device shown in Fig. 3, particularly illustrating the thermostatic element.

As seen particularly in Fig. 3, intake valve 43 has a cylindrical body portion 45 in which the tubular shaped, pressure release valve 46 is slidably supported. The one end of the valve 46 has an outwardly extending flange provided with an annular ridge, which flange forms the valve-head 47 which is yieldably urged in engagement with the outer surface of the intake valve 43 by a spring 48 interposed between the valve 43 and a cup-shaped member 49, secured to the end of the tubular shaped valve 46 opposite its head portion 47. As will be seen in Fig. 3, the tubular shaped valve 46 has two side openings, one designated by the numeral 50 the other by the numeral 51. The opening 50 is normally within the confines of the cylindrical body portion 45 of valve 43 and therefore normally closed. However, opening 51 is always outside the cylindrical body portion 45 of valve 43 and consequently there is a constant communication between the fluid displacement chamber 45 and the interior of the tubular valve 46. The outer end of the tubular valve 46, that is, the end at which the head 47 is provided, is substantially constantly open. The end of this tubular portion 46 to which the cup-shaped member 49 is secured is interiorly threaded as at 53, this threaded portion receiving the threaded part 54 of the stem 55 which extends longitudinally through the tubular valve 46 and has a head 56 which lies in juxtaposition to the open end of tubular valve so as to restrict fluid flow through it. A part of the stem 55 extends into the cup-shaped member 49 and has one end of a thermostatic strip 60 attached thereto. This thermostatic strip as shown in Fig. 4 is spirally wound, the outer end having an angular bend which is adapted to fit into a plurality of openings 61 provided in spaced relation in the annular wall of the cup-shaped member 49.

The thermostatic, spirally wound element 60 is preferably of bi-metal so that temperature changes will cause it to wind up or unwind. This action, due to the one end of the bi-metallic strip being anchored to the substantially non-rotating tubular valve 46, causes the stem 55, to which the opposite end of said thermostatic element is anchored, to be rotated, which rotation, due to the threaded connection between said stem 55 and the tubular valve 46, will cause the stem to be moved longitudinally relatively to said tubular valve. Thus it may be seen that rotation of stem 55 by the threaded element 50 will cause the head portion 56 of said stem to be moved into closer proximity to or further away from the open end of the tubular valve 46, thereby respectively increasing or decreasing the restriction offered by said head portion 56 to the fluid flow from this open end of the tubular valve 46.

Another port 70 is provided in the wall of the cylinder forming communication between the displacement chamber 35 and the reservoir 31. Any suitable pressure release valve 71 is provided for this port, this valve being loaded by a spring 72 which is of sufficient strength that a greater pressure in the displacement chamber 35 is necessary to move valve 71 from its seat to permit fluid flow through port 70 than is necessary to move valve-head 47 from engagement with the valve 43 to establish a restricted flow from chamber 35 through the piston passage 34 into the reservoir.

Figure 2:
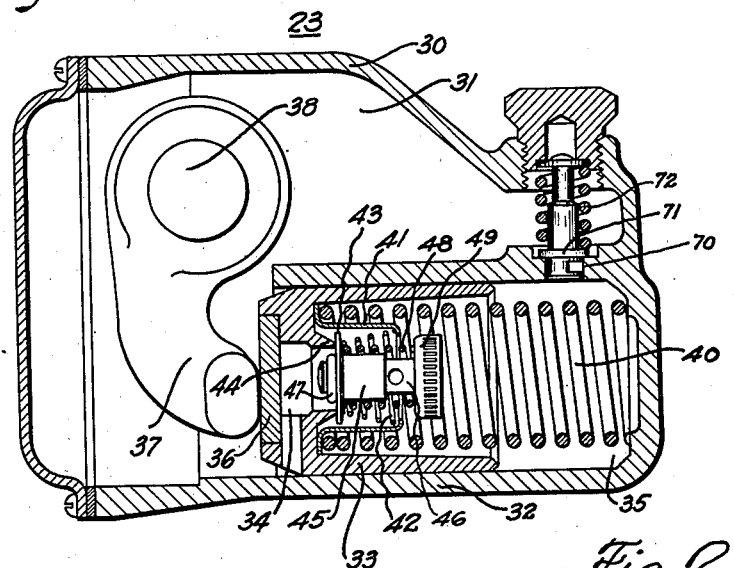
Fig. 2 is a longitudinal sectional view taken through the shock absorber and showing its interior construction.

Briefly, the shock absorber acts in the following manner:

In response to the striking of an obstruction by the road wheels of the vehicle the axle 21 is thrust upwardly toward the frame 20, compressing spring 22 and resulting in a clockwise rotation of the shock absorber shaft 38 due to its connection with said axle by the link 25 and the shock absorber operating arm 24. In response to such rotation of shaft 38, the free end of cam 37 is moved toward the left as regards Fig. 2 and consequently spring 40 will cause piston 43 to follow said cam and thus be moved toward the outer end of the cylinder. In response to this piston movement fluid will act through passage 34 against valve 43 to move the entire valve assembly against the effect of the comparatively light spring 42 whereby a fluid flow of substantially no restriction is permitted through the passage 34 past the valve 43 into the fluid displacement chamber 35.

As the vehicle spring 22 moves toward normal position on its rebounding movement, a reverse rotation of the shaft 38 and its cam 37 obtains. The counter-clockwise movement of these members will push the piston 33 into the cylinder 32 to exert a pressure upon the fluid within the displacement chamber 35. The first flow of fluid will be from the chamber 35 through the opening 51 into the tubular valve 46 thence through said valve and through the orifice presented between the head portion 56 of the stem 55 and the open end in the head portion 47 of the tubular valve 46. If this orifice will not properly relieve the pressure within chamber 35, then the tubular valve 46 will be moved by pressure to slide relatively to the valve 43 and consequently the head part 47 of said valve 46 will be moved out of engagement with valve 43 thereby uncovering the side opening 50. This establishes another route for fluid flow, for now the fluid may flow from the interior of the intake valve 46 through the side opening 50 past the head 47 into and through the piston passage 34 into the reservoir 31. If this fluid flow is not sufficient to relieve pressure within the chamber 35 then the excessive pressure will move valve 71 against the effect of its spring 72 to provide a fluid flow from chamber 35 through the port 70 into the reservoir 31.

If, at substantially low temperatures, the viscosity of the fluid increases, then the ordinary orifice presented between the head 56 of the stem 55 and the open end of tubular valve 46 is comparatively too small to have the shock absorber function properly and consequently the thermostatic element 60 responding to such lower temperature will act to rotate shaft 55 so that the head 56 will be moved a greater distance from the open end of the tubular valve 46, thereby increasing the orifice and consequently reducing the resistance offered to the flow of this increased viscosity fluid. On the other hand, during a hot summer where the fluid will flow more freely than in colder weather and the shock absorber is to offer proper resistance the thermostatic element 66 will respond to the higher temperature, acting to turn stem 55 so that the head 56 is moved into closer proximity to the open end of the tubular valve 46, thus increasing the restriction corresponding to the freer fluidity of the fluid within the shock absorber.

The numerous openings 61 in the cup-shaped member 49 permit proper adjustments at normal temperatures. It will be seen that the end of the thermostatic element may be removed from one opening and placed into another so that the stem 55 will be properly positioned to provide the desired orifice.

From the aforegoing it may be seen that applicant has provided a unitary valve structure which includes the intake valve, adapted to establish a substantially free flow of fluid into the displacement chamber as the piston moves in one direction; it includes also a variable orifice adapted to establish a restricted flow of fluid initially from the chamber 35 through the piston into the reservoir 31 in response to the movement of the piston in the opposite direction and in accordance with existing temperatures; and it also provides a pressure release valve which, in response to a predetermined pressure, will provide for a pressure relieving fluid flow from the chamber 35 through the piston into the reservoir 31 in addition to the flow established by the thermostatically controlled orifice.

While the embodiment of the present invention as herein disclosed, constitutes a preferred form, it is to be understood that other forms might be adopted, all coming within the scope of the claims which follow.

What is claimed is as follows:

1. A fluid flow control device for a passage in a hydraulic shock absorber, comprising in combination, two valves one supported by the other, the one adapted to provide for a fluid flow through said passage in one direction the other valve adapted to provide a divided flow of fluid in the opposite direction; and a thermostatically controlled device for regulating the one of said divided flows of fluid in response to temperature changes.

2. A fluid flow control device for a passage in a hydraulic shock absorber, comprising in combination, two valves one supported by the other, and adapted to control the fluid flow through said passage in opposite directions, one of said valves having two discharge ports one normally closed by the other valve; means for restricting the flow of fluid from the other discharge port of said valve; and temperature controlled means for adjusting the aforementioned restricting means in accordance with temperature changes.

3. A fluid flow control device for a passage in a hydraulic shock absorber comprising, in combination, two valves, one a disc-valve slidably supporting the other, a tubular valve which has two discharge ports one of which is normally closed by the disc-valve; a spring yieldably urging the two valves into normal relative positions; means restricting the flow of fluid through the one discharge port of the tubular valve; and thermostatic means for adjusting the aforementioned means to vary its restriction to fluid flow in accordance with temperature changes.

4. A fluid flow control device for a passage in a hydraulic shock absorber comprising, in combination, two valves, one a disc-valve slidably supporting the other, a tubular valve which has two discharge ports one of which is normally closed by the disc-valve; a spring yieldably urging the two valves into normal relative positions; means within the tubular valve and threadedly connected thereto, said means having a portion restricting one of the discharge ports of said valve; and thermostatic means connected between the aforementioned means and the tubular valve for actuating said aforementioned means to vary its restriction of the discharge port in accordance with temperature changes.

5. A fluid flow control device for a passage in a hydraulic shock absorber comprising, in combination, two valves, one a disc-valve slidably supporting the other, a tubular valve which has two discharge ports one of which is normally closed by the disc-valve; a spring yieldably urging the two valves into normal relative positions; a regulating member in the tubular valve, said member comprising a stem having a head, the stem being threadedly supported by the tubular valve, the head restricting the one discharge port of the tubular valve; and a thermostatic element one end of which is anchored to the stem of the regulating member the other end to the tubular valve; said element being adapted to rotate the stem in response to temperature changes for moving said regulating member longitudinally of the tubular valve to vary the restriction of said regulating member.

6. A unitary valve structure comprising, in combination, a disc-valve having a cylindrical body portion; a tubular valve slidably supported by said disc-valve and having two discharge ports, one normally open, the other normally closed by the disc-valve; a spring interposed between said valves yieldably urging them into normal relative positions; interior screw-threads provided at one end of the tubular valve; a cup-shaped member attached to said end of the tubular valve; a stem-valve threadedly supported within the tubular valve and having a head portion restricting the normally open discharge port of the said tubular valve; and a bimetallic element in the cup-shaped member, having one end anchored to said member and the other end to the stem-valve, for adjusting said stem valve to vary its restriction of the discharge port of the tubular valve in response to and in accordance with temperature changes.

WILLIAM A. CHRYST.